United States Patent [19]
Bennett et al.

[11] Patent Number: 5,261,749
[45] Date of Patent: Nov. 16, 1993

[54] STRAW WALKER BEARING

[75] Inventors: Robert E. Bennett, Moline; Michael D. Schwartz, East Moline, both of Ill.

[73] Assignee: Deere & Company, Moline, Ill.

[21] Appl. No.: 929,646

[22] Filed: Aug. 12, 1992

[51] Int. Cl.⁵ .............. F16C 33/02; F16C 23/02; A01F 12/30
[52] U.S. Cl. .............. 384/276; 384/247; 384/428; 460/85
[58] Field of Search ........ 384/294, 416, 428–437, 384/247, 252, 263, 266; 460/85

[56] References Cited

U.S. PATENT DOCUMENTS

| | | | |
|---|---|---|---|
| 2,335,638 | 11/1943 | Bogner | 384/266 |
| 2,937,647 | 5/1960 | Allen et al. | 460/85 |
| 3,265,451 | 8/1966 | Bulin | 384/430 |
| 3,820,860 | 6/1974 | Stone | 384/428 |
| 4,083,580 | 4/1978 | Shaner | 384/434 X |
| 4,392,500 | 7/1983 | Houle | 460/85 |

FOREIGN PATENT DOCUMENTS 69161 1/1983 European Pat. Off. ......... 460/85

Primary Examiner—Thomas R. Hannon

[57] ABSTRACT

Straw walker bearing having two bearing portions that are bolted together around a straw walker crank. The upper bearing portion is provided with mounting pads for mounting the straw walker pan to the bearing. Each bearing portion has a semi-cylindrical recess for accommodating the straw walker crank. Each bearing portion is provided with a first edge having a raised outer lip and a second edge having a raised inner lip. When the bearing portions are coupled to one another the edges adjoin and form a standard fit configuration or a tight fit configuration.

17 Claims, 2 Drawing Sheets

STRAW WALKER BEARING

BACKGROUND OF THE INVENTION

1. Field of the Invention

The invention is directed to a bearing used for coupling a straw walker pan to a straw walker crank.

2. Description of the Prior Art

Agricultural combines process a harvested crop by first threshing the harvested crop, then separating the threshed crop, and finally cleaning the chaff from the separated grain. In conventional combines the separating function is accomplished by straw walkers. Straw walkers expand and agitate the threshed crop mat so that grain is free to fall through the crop mat to the cleaning system. The straw walkers comprise a series of pans arranged axially within the combine. These pans are moved up and down, and forward and backward, by transverse straw walker cranks located on the underside of the pans.

Presently, straw walker pans are coupled to the cranks by wooden bearing blocks. The straw walker cranks are provided with a series of throws that correspond to a series of separate straw walker pans. Crimped centering rings are mounted to each crank. Two wooden blocks each having a semi-cylindrical recess for half the crank and a corresponding recesses for centering rings are sandwiched around the straw walker crank and bolted to one another. The centering rings prevent the bearing from moving transversely along the crank.

Because of the manufacturing process used in manufacturing straw walker cranks the outer diameter of the throws of some cranks maybe greater than desired. When wooden bearings designed for conventional cranks are mounted to large diameter cranks the wooden bearings are tight and cause excessive wear of the cranks and bearing. In the past cardboard spacers were inserted between the wooden bearing portions. After approximately five hundred hours of operation the spacers were removed and the bearing retightened.

Straw walker bearings work in a harsh pressurized dust infested environment. Wooden bearings shrink and swell according to the moisture in the air. As such the bearings run tight or loose in accordance with the humidity. The wood can also become embedded with dirt and grit which acts as an abrasive to wear the steel crank. In addition, the crimped steel centering rings may become loose allowing the walker pans to collide with one another and crimped centering rings are difficult to repair.

SUMMARY OF THE INVENTION

It is an object of the present invention to provide a low wear straw walker bearing that can be readily maintained.

It is another object of the present invention to provide a straw walker bearing with a tight fit configuration and a standard fit configuration.

The straw walker bearing of the present invention comprises two bearing portions having semi-cylindrical recesses for receiving the straw walker crank. The bearing portions are sandwiched around a transverse straw walker crank. Two rings are clamped about each throw of the crank for centering the bearing portions on the throw. Each centering ring comprises two semi-circular portions that are bolted to one another clamping the crank therebetween. Each bearing portion is provided with two centering recesses for accommodating the centering rings on each throw. One of the bearing portions is an upper portion which is provided with mounting pads for mounting the bearing to a straw walker pan. The other bearing portion is the lower bearing portion and is provided with a grease zerk for injecting lubricant into the bearing. Bolts pass through the straw walker pan, the upper bearing portion and into the lower bearing portion for securing the pan to the straw walker crank.

Each bearing portion is provided with two edges that adjoin the edges of the other bearing portion when they are clamped together around a straw walker clamp. The first edge of each bearing portion is provided with an outer raised lip. The second edge is provided with an inner raised lip. When the bearing portions are mounted together so that the first edge of one bearing portion adjoins the first edge of the other bearing portion, and the second edges also adjoin, the bearing is in its standard fit configuration. In its standard fit configuration, the raised lips space the bearing portions apart from one another when they are bolted together. In its tight fit configuration the first edge of the upper bearing portion adjoins the second edge of the lower bearing portion.

DETAILED DESCRIPTION

Figure 1:
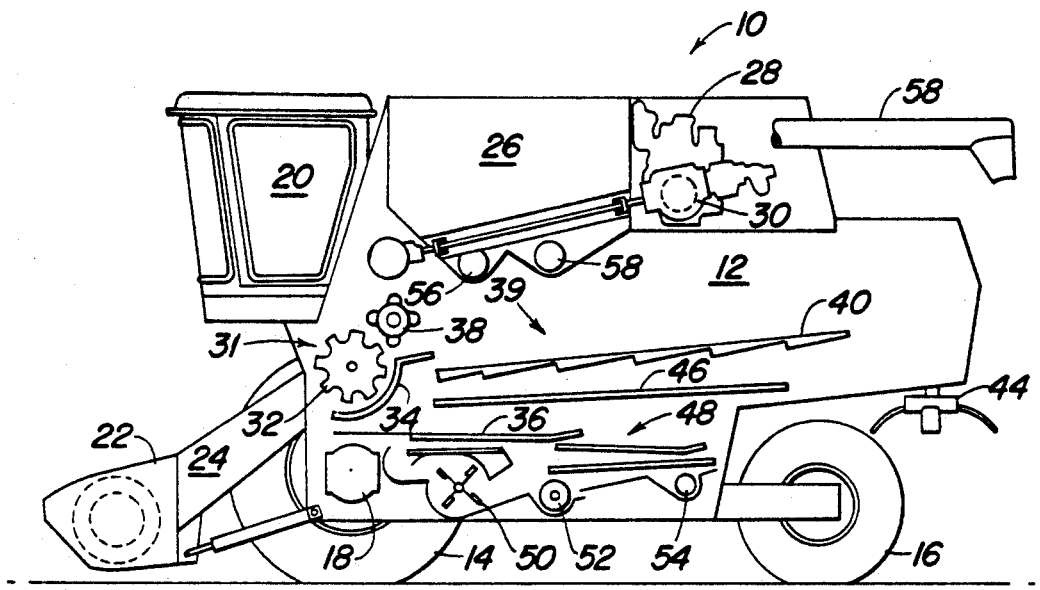
FIG. 1 is a side view of a combine schematically illustrating the operating means.

FIG. 1 illustrates an agricultural combine 10 having a supporting structure 12 and ground engaging wheels 14 and 16. Forward ground engaging wheels 14 are driven by hydraulic motor 18 located between the wheels. An operator seated in operator's control cab 20 controls the operation of the combine. Harvesting platform 22 extends forwardly from the supporting structure of the combine and is used for harvesting a crop in a field. After harvesting, the crop is then directed through feederhouse 24 into the combine. Clean grain compartment 26 is located behind the operator's cab at the top of the combine. Behind compartment 26 is transverse internal combustion engine 28 which is the prime mover of the combine, powering the propulsion means, the harvesting means, and the threshing and separating means. The internal combustion engine 28 is provided with a driving means 30 for powering the various usage assemblies.

Between the side sheets of the combine, which form the supporting structure of the combine, is located the threshing means, the separating means and the cleaning system. The threshing and separating means separates the grain from the straw and chaff of the harvested crop. The feederhouse directs the harvested crop to threshing means 31. The threshing means comprises transverse threshing cylinder 32, transverse concave 34 and beater 38. As the crop passes between cylinder 32 and concave 34, grain and chaff fall through the concave onto pan 36 and the remaining straw and unseparated grain is advanced to beater 38.

After threshing, the straw in the crop is advanced to separating means 39. The main elements of the separating means are straw walkers 40. From beater 38 the threshed crop is advanced to oscillating straw walkers 40 which direct the straw to the rear of the combine where it is returned to field by straw spreader 44. Grain and chaff falling through the straw walkers falls onto oscillating slanted pan 46 which directs the grain and chaff to pan 36. The grain and chaff are directed from pan 36 by overhead auger assemblies to the cleaning system. The main element of the cleaning system is cleaning shoe 48. The cleaning shoe 48 is used to separate the chaff from the grain. The grain and chaff falling onto the chaffer and sleeve of the cleaning shoe assembly encounters an air stream from fan 50 which blows the lighter chaff out the rear of the combine while the heavier grain falls through the cleaning shoe assembly and into clean grain receiving auger 52.

Auger 52 directs the clean grain to a clean grain elevator (not shown) which in turn directs the grain to clean grain compartment 26. Tailings, that is unthreshed heads of grain, fall into tailings auger 54 which directs the unthreshed heads back to the threshing cylinder and concave. When the clean grain compartment is to be unloaded, transverse unloading augers 56 and 58 direct the grain to the side of the compartment where it comes into contact with a vertical unloading auger (not shown) which directs the clean grain through unloading tube 58. During unloading operation, tube 58 which would normally be extended outward from the side of the combine so that the clean grain can be more readily directed into a wagon or truck. It should be noted that this overall combine configuration is called a conventional combine and is well known. The primary purpose of the present invention is directed to new and improved bearing assemblies for the straw walker cranks.

Figure 2:
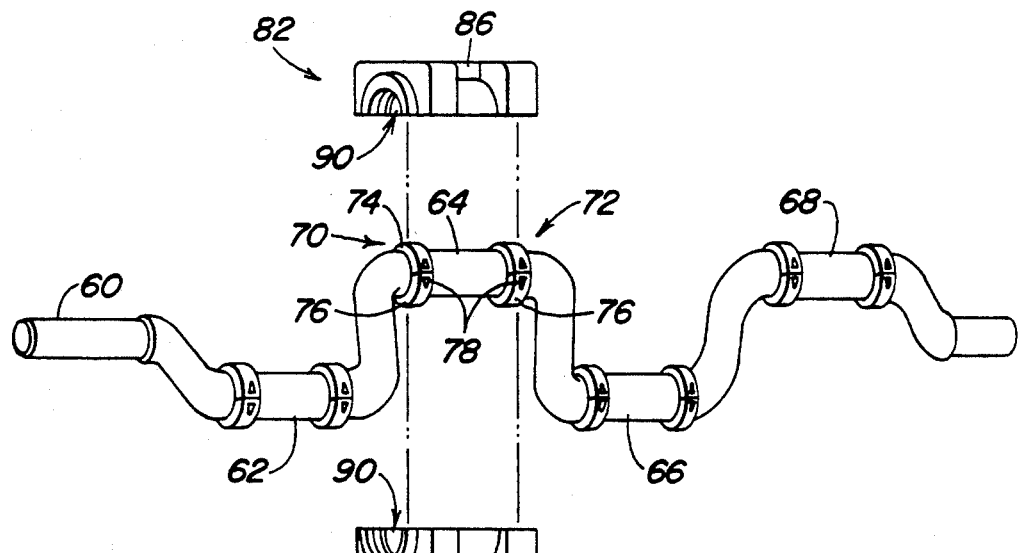
FIG. 2 is a perspective view of a straw walker crank and the improved bearing assembly.

FIG. 2 shows a transverse straw walker crank 60 having four throws 62, 64, 66 and 68. Two centering rings 70 and 72 are mounted to each throw. Each centering ring comprises two semi-circular rings 74 and 76 that are bolted to one another by bolts 78 clamping the straw walker crank therebetween. Bolt on centering rings facilitate repair of the straw walker cranks by allowing a mechanic to easily adjust the position of the centering rings when repairing the combine.

The improved straw walker bearing 80 comprises two bearing portions 82 and 84. Upper bearing portion 82 is provided with mounting pads 85 and a blocking flange 86. The straw walker pan rests on the mounting pads. Bolts pass through the pan into bolt holes 96. The blocking flange is located between the mounting pads and prevents crop material from getting stuck between the pan and the top surface of the upper bearing portion.

Figure 3:
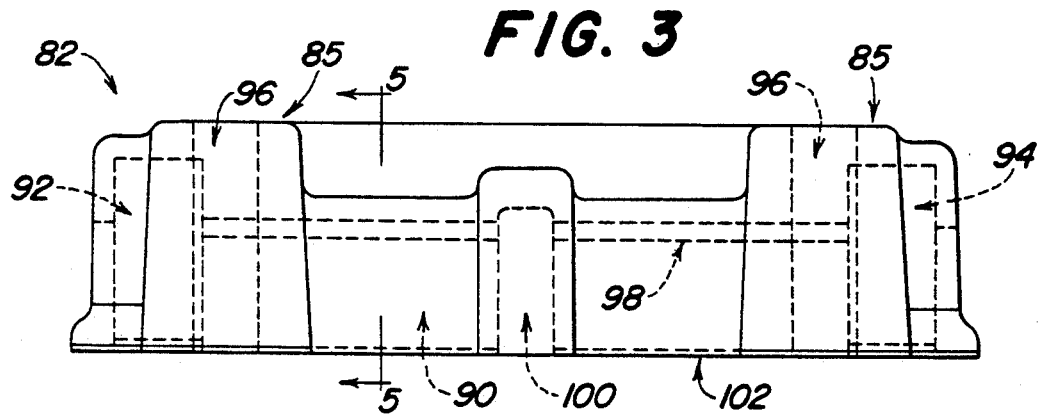
FIG. 3 is a front view of the upper bearing portion.
Figure 4:
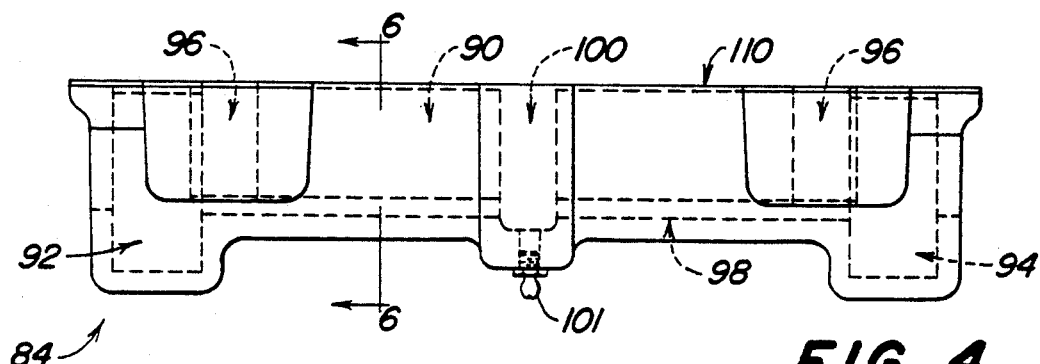
FIG. 4 is a front view of the lower bearing portion.

The bearing portions are best illustrated in FIGS. 3 and 4. Both bearing portions comprise bodies having longitudinally extending semi-cylindrical recesses 90 extending the transverse length of the bearing portion. Both portions are also provided with two centering recesses 92 and 94 for receiving the centering rings. When the bearing portions are coupled together the semi-cylindrical recesses 90 adjoin one another and form a cylindrical recess for receiving the straw walker crank. Similarly, the centering recesses form two cylindrical recesses for receiving the centering rings.

Each bearing portion is also provided with four bolt holes 96 (only two shown) which align with one another and form a mounting assembly for mounting the straw walker pan to the bearing and straw walker crank. The bolts pass through the pan into the bearing portions when the pan is coupled to the straw walker crank.

Both bearing portions are made from a zinc alloy and can be lubricated. A series of longitudinally extending passages 98 extend the length of the two semi-cylindrical recesses 90 so that lubricants, such as grease, can be evenly distributed throughout the bearing. In addition, these passages interrupt the cylindrical surface defined by the bearing portions so that grit and metal particles can be intercepted by the grooves before damaging the bearing portions and the crank.

Both bearing portions define a central circular recess 100 which forms a lubricant reservoir for distributing lubricant to the longitudinal grooves 98. Grease is injected into the bearing through grease zerk 101 located on lower bearing portion 84. The central circular recess has a second function, that is to allow the improved bearing to more easily be retrofitted onto existing combines with a single centering ring. In retrofitting the improved bearing, new centering rings are bolted to the crank arm and the existing crimped on centering fits into the central recess 100.

The upper bearing portion is provided with a first edge 102 and a second edge 104. The first edge is provided with an outer raised lip 106, whereas the second edge is provided with a inner raised lip 108. Similarly the lower bearing portion also has a first edge 110 that is provided with an outer raised lip 112, and a second edge 114 that is provided with an inner raised lip 116.

Figure 5:
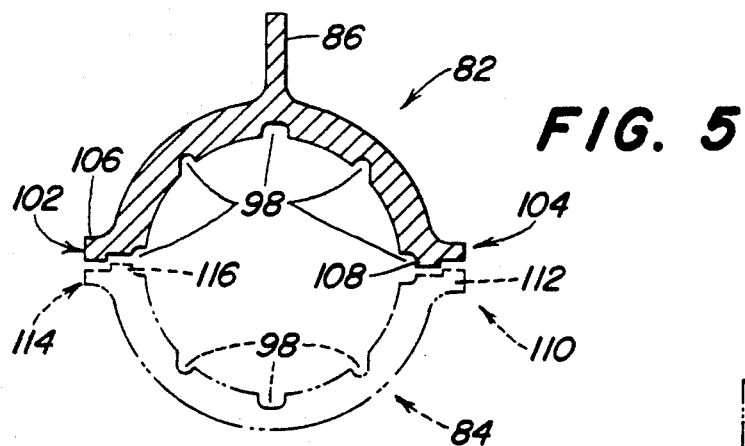
FIG. 5 is a cross sectional view of the bearing portions in their tight configuration, with the upper bearing portion taken along line 5—5.
Figure 6:
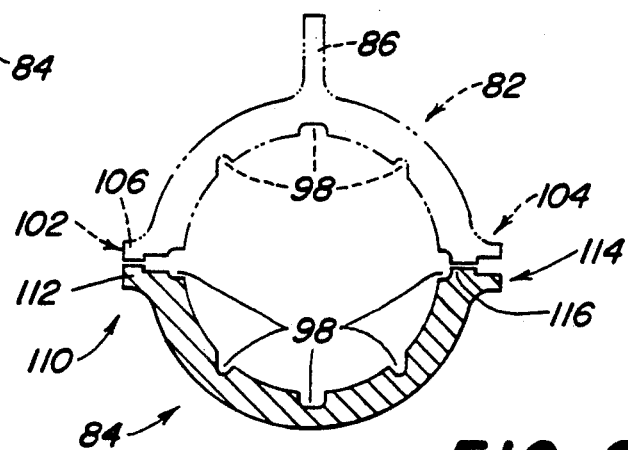
FIG. 6 is a cross sectional view of the bearing portions in their loose configuration, with the lower bearing portion taken along line 6—6.

These raised lips allow the bearing portions to be mounted in either one of two configurations. The bearing portions can be mounted in a tight fit configuration as illustrated in FIG. 5, wherein the first edge of one adjoins the second edge of the of the other, or in a standard fit configuration, illustrated in FIG. 6, where the first edge of one adjoins the first edge of the other and similarly the second edge of one adjoins the second edge of the other.

When mounting the improved straw walker bearing to a new straw walker crank, the bearing is mounted in its standard fit configuration. As the bearing becomes loose, the operator reverses the lower bearing so that the bearing is placed in its tight fit configuration.

The present invention is directed to an improved straw walker bearing and should not be limited by the above described embodiment, but should be limited solely by the claims that follow.

We claim:

1. A straw walker bearing for mounting the straw walker pans to a straw walker crank in an agricultural combine, the bearing comprising:

an upper bearing portion having a mounting assembly for mounting the bearing portion to a straw walker, the upper bearing portion having a longitudinal semi-cylindrical recess and first and second edges;

a lower bearing portion having a longitudinal semi-cylindrical recess and first and second edges that adjoin the edges of the upper bearing portion when the bearing portions are coupled together, the semi-cylindrical recesses of the bearing portions forming a space into which a straw walker crank can be received;

the first edges of the upper and lower bearing portions are provided with an outer raised lip, and the second edges of the upper and lower bearing portions are provided with an inner raised lip, whereby said bearing has two mounting configurations, a first configuration in which the first edge of the upper bearing portion adjoins the first edge of the lower bearing portion, and the second edge of the upper bearing portion adjoins the second edge of the lower bearing portion so that the raised lips of the edges contact one another providing a standard fit configuration; and a second configuration in which the first edge of the upper bearing portion adjoins the second edge of the lower bearing portion, and the second edge of the upper bearing portion adjoins the first edge of the lower bearing portion so that the raised lips of the edges nest with one another providing a tight fit configuration.

2. A straw walker bearing as defined by claim 1 wherein each bearing portion is provided with a centering recess for receiving a centering ring mounted on a straw walker crank.

3. A straw walker bearing as defined by claim 2 wherein each bearing portion is provided with at least two semi-circular centering recesses.

4. A straw walker bearing as defined by claim 2 wherein each bearing portion is provided with longitudinal grooves for distributing lubricant throughout said bearing.

5. A straw walker bearing as defined by claim 4 wherein each bearing portion is provided with a central circular recess for holding lubricant, the longitudinal grooves are connected to the central circular recess for distributing lubricant throughout said bearing.

6. A straw walker bearing as defined by claim 5 wherein the lower bearing portion is provided with a grease zerk for injecting lubricant into the central circular recess.

7. A straw walker bearing as defined by claim 1 wherein the upper bearing is provided with two separate mounting pads onto which a straw walker pan is mounted, a blocking flange extends between the mounting pads for preventing straw and other crop material form accumulating between the bearing and a straw walker pan.

8. A straw walker assembly for an agricultural combine, the assembly comprising:
   at least two axial straw walker pans;
   at least one transverse straw walker crank having at least two throws;
   at least two straw walker bearings for mounting the straw walker pans to the straw walker crank, each bearing is provided with an upper portion and a lower portion, the upper and lower portions are provided with semi-cylindrical surfaces for receiving the straw walker crank therebetween and mounting the bearing to one of the throws of the straw walker crank, the upper bearing portion is provided with a mounting assembly for mounting the bearing to one of the straw walker pans, each bearing portion is provided with a first edge and a second edge, the first and second edges of the upper bearing portion adjoin the edges of the lower bearing portion when the bearing portions are mounted together, the first edges of the upper and lower bearing portions are provided with an outer raised lip, and the second edges of the upper and lower bearing portions are provided with an inner raised lip, whereby said bearing has two mounting configurations, a first configuration in which the first edge of the upper bearing portion adjoins the first edge of the lower bearing portion, and the second edge of the upper bearing portion adjoins the second edge of the lower bearing portion so that the raised lips of the edges contact one another providing a standard fit configuration; and a second configuration in which the first edge of the upper bearing portion adjoins the second edge of the lower bearing portion, and the second edge of the upper bearing portion adjoins the first edge of the lower bearing portion so that the raised lips of the edges nest with one another providing a tight fit configuration.

9. A straw walker assembly as defined by claim 8 wherein each throw of the straw walker crank is provided with a centering ring and each bearing portion is provided with a centering recess for receiving a centering ring mounted on the straw walker crank.

10. A straw walker assembly as defined by claim 9 wherein each centering ring comprises two semi-circular ring portions that are bolted to one another clamping the straw walker crank therebetween.

11. A straw walker assembly as defined by claim 10 wherein each bearing portion is provided with a central circular recess for holding lubricant, the longitudinal grooves are connected to the central circular recess for distributing lubricant throughout said bearing.

12. A straw walker assembly as defined by claim 11 wherein the lower bearing portion is provided with a grease zerk for injecting lubricant into the central circular recess.

13. A straw walker assembly as defined by claim 8 wherein the upper bearing is provided with two separate mounting pads onto which the straw walker pan is mounted, a blocking flange extends between the mounting pads for preventing straw and other crop material from accumulating between the bearing and the straw walker pan.

14. An upper bearing portion for a straw walker bearing, for mounting the straw walker pans to a straw walker crank in an agricultural combine, the upper bearing portion comprising:
   a body having two separate mounting pads for mounting a straw walker pan to the upper bearing portion, a blocking flange extending between the mounting pads for preventing straw and other crop material from accumulating between the bearing and a straw walker pan mounted to the upper bearing portion, and a longitudinal semi-cylindrical recess for receiving a straw walker crank.

15. An upper bearing portion as defined by claim 14 wherein the body portion is also provided with at least one centering recess for accommodating centering rings.

16. An upper bearing portion as defined by claim 15 wherein the body is provided with longitudinal grooves for distributing lubricant throughout the bearing portion and the body is provided with a central semi-circular recess for holding lubricant, the longitudinal grooves are connected to the central semi-circular recess for distributing lubricant throughout the semi-cylindrical recess.

17. A lower bearing portion for a straw walker bearing, for mounting the straw walker pans to a straw walker crank in an agricultural combine, the lower bearing portion comprising:
   a body having a longitudinal semi-cylindrical recess for accommodating a straw walker crank, at least one centering recess for accommodating a centering ring, longitudinal grooves for distributing lubricant throughout the bearing portion, a central circular recess for holding lubricant, the longitudinal grooves are connected to the central semicircular recess for distributing lubricant throughout the semi-cylindrical recess, and a grease zerk for injecting lubricant into the central semi-circular recess.

* * * * *